Jan. 13, 1970   W. J. McCLAIN ET AL   3,489,297
METHOD AND SYSTEM FOR PARKING AIRCRAFT AT CROWDED TERMINALS
Filed March 9, 1967   4 Sheets-Sheet 1
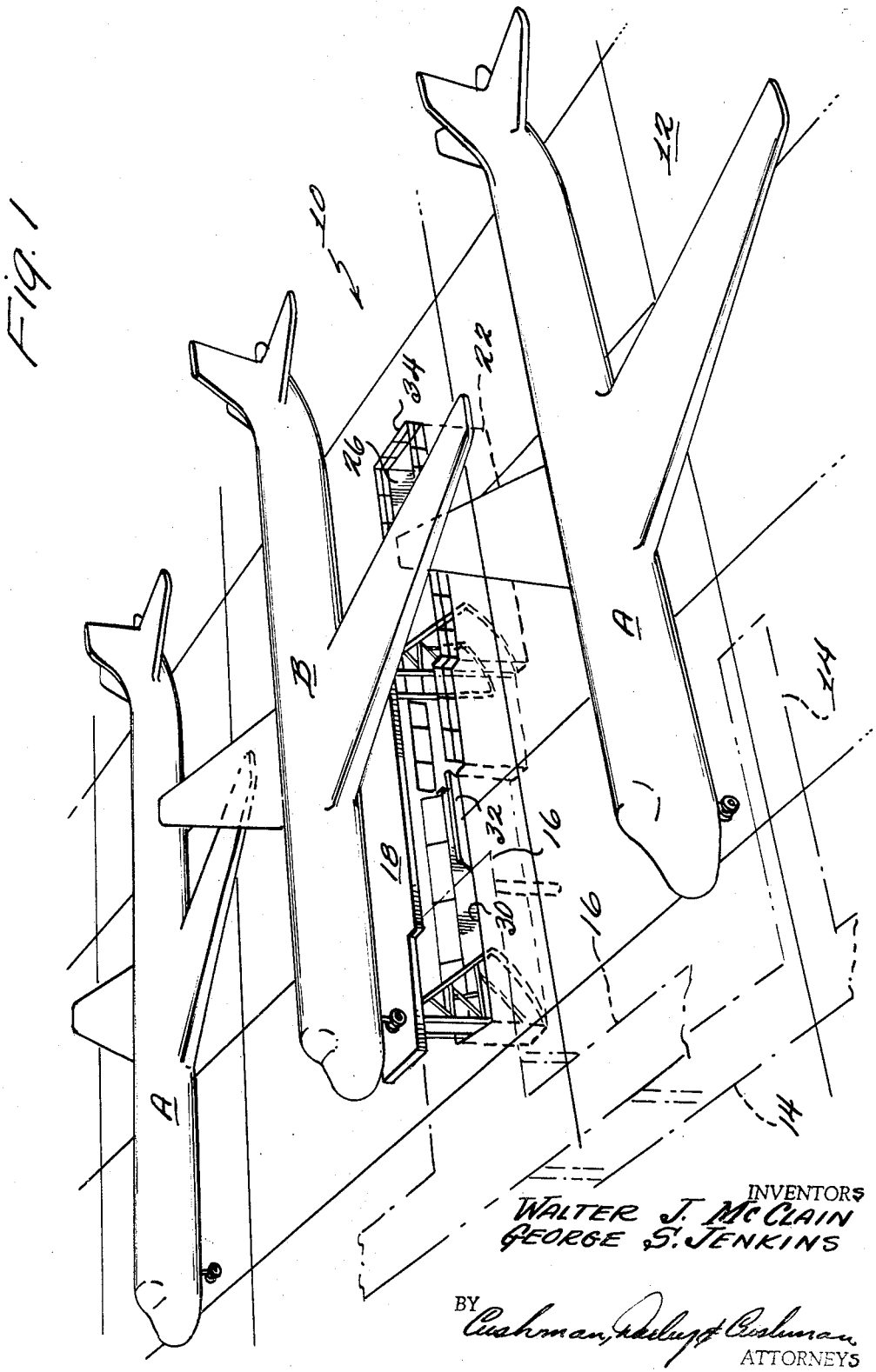
INVENTORS
WALTER J. McCLAIN
GEORGE S. JENKINS
BY Cushman, Darby & Cushman
ATTORNEYS

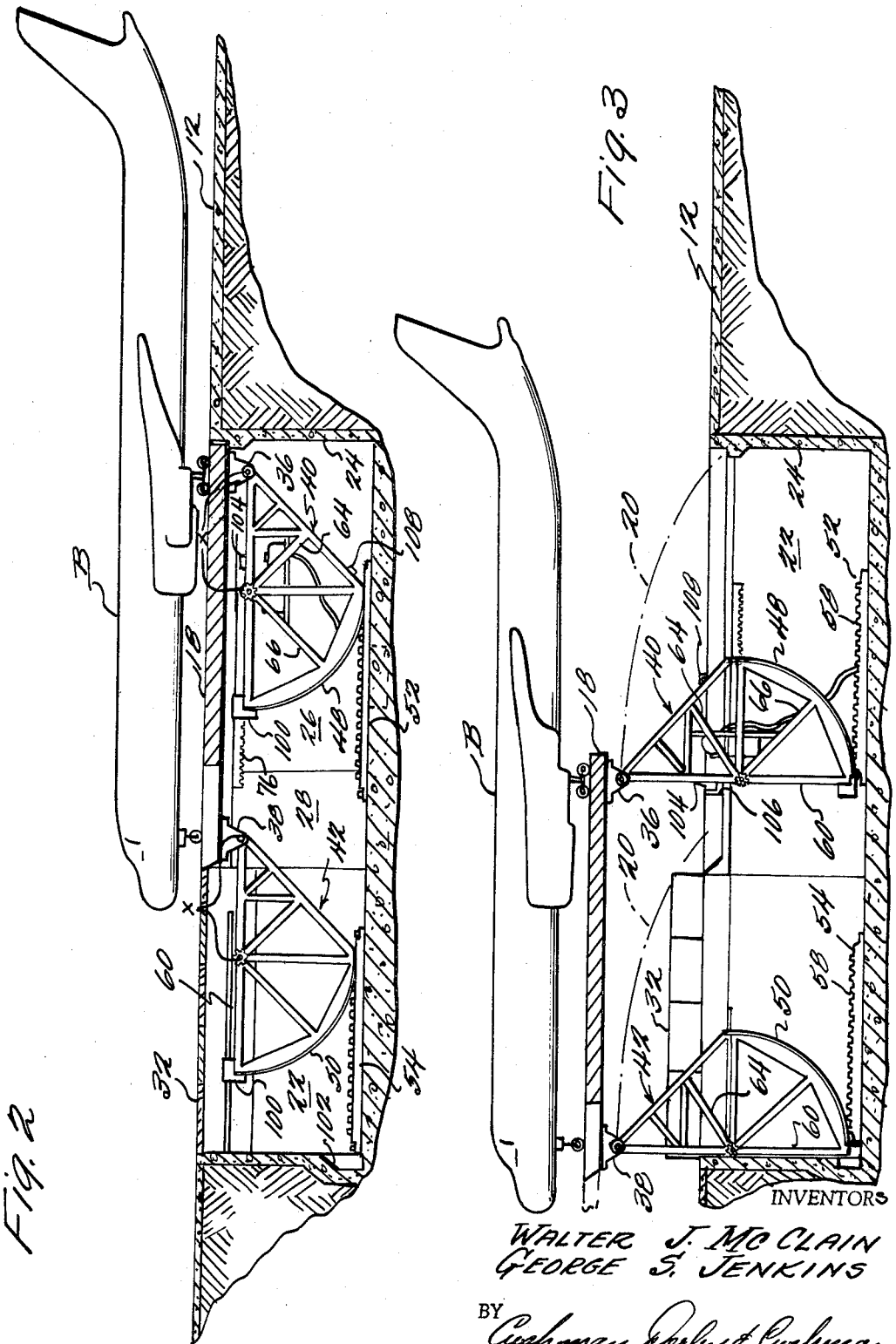

Jan. 13, 1970  W. J. McCLAIN ET AL  3,489,297
METHOD AND SYSTEM FOR PARKING AIRCRAFT AT CROWDED TERMINALS
Filed March 9, 1967  4 Sheets-Sheet 4
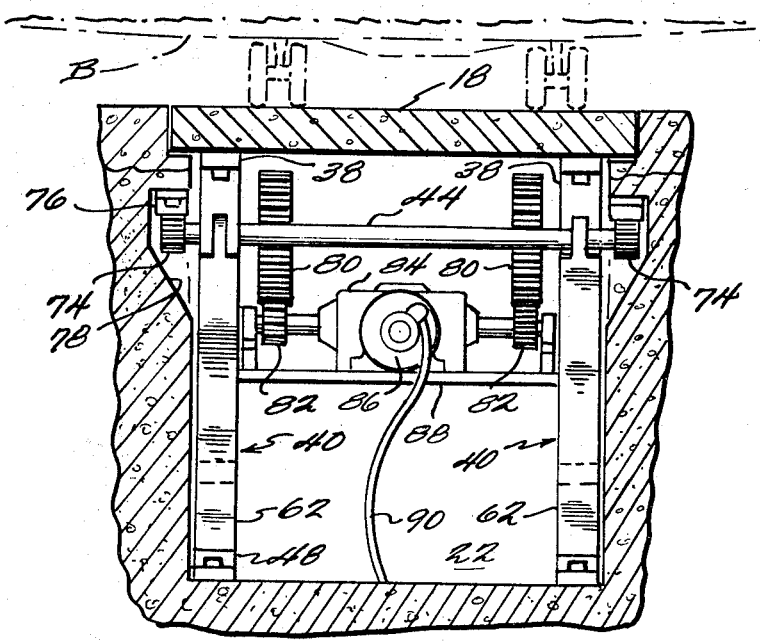
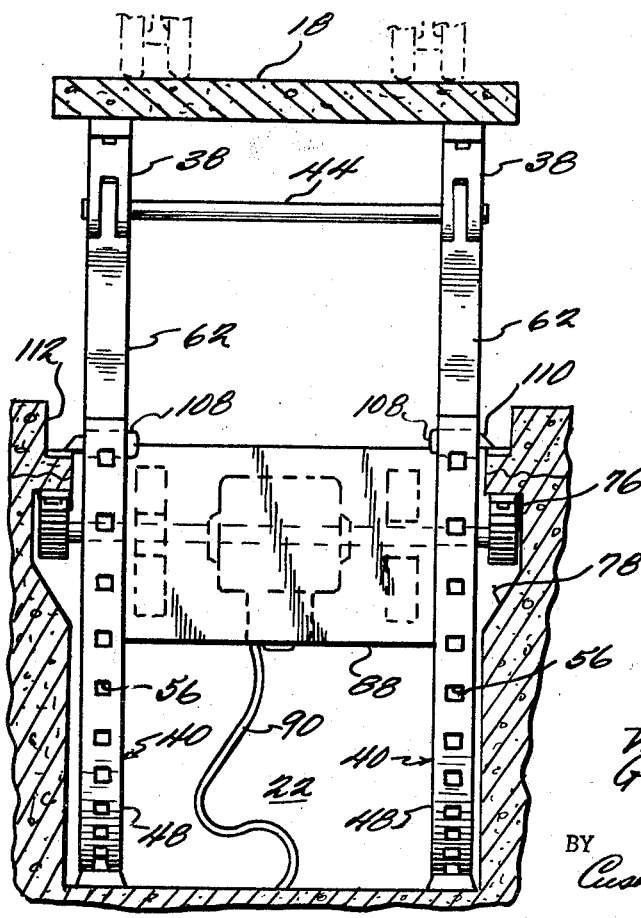
INVENTORS
WALTER J. McCLAIN
GEORGE S. JENKINS
BY
Cushman, Darby & Cushman
ATTORNEYS

United States Patent Office 3,489,297
Patented Jan. 13, 1970

3,489,297
METHOD AND SYSTEM FOR PARKING AIRCRAFT AT CROWDED TERMINALS
Walter J. McClain and George S. Jenkins, Tampa, Fla., assignors to J. E. Greiner Company, Baltimore, Md., a partnership
Filed Mar. 9, 1967, Ser. No. 621,833
Int. Cl. B64f 1/36; B66f 7/10
U.S. Cl. 214—16.1                                    15 Claims

ABSTRACT OF THE DISCLOSURE

A method and system for parking aircraft at airport terminals with alternate aircraft being raised so that the wings of the raised aircraft are above and overlap the wings of adjacent aircraft parked at ground or apron level. The apparatus includes a movable platform normally positioned at ground or apron level for receiving the aircraft thereon, the platform being raised vertically and moved horizontally simultaneously so that the aircraft is lifted up and over adjacent parked aircraft.

---

The present invention relates to a method and a system for increasing the parking facilities of aircraft at congested airport terminals, and, more particularly, to a method and system in which an aircraft is positioned on a movable platform which can lift the aircraft up and over other aircraft parked on either side so that the wings of the raised aircraft are above and overlap the wings of adjacent aircraft.

Present airport terminal facilities are limited in their expansion to accommodate more and larger aircraft due to scarcity of land. Recently many studies have been made to seek solutions for increasing the parking facilities and meeting the ground handling needs of aircraft around crowded terminals. One proposal for solution of the congestion was to build narrow ramps with an elevated parking space, the ramps being separated by spaces in between for parking of aircraft at ground or apron level. The ramps which had to extend outwardly from the terminal a considerable distance from their upper parking surface so that the slope from ground level was not too steep, did not provide a practical solution to the liftover concept of parking alternate aircraft with their wings overlapping as the ramps limited the taxi space for aircraft parked on the ground level and required considerable power from the aircraft to be taxied up the ramp to the loading level. Additionally, the cost of building such ramps would be extremely high and the operation of backing an aircraft down the ramp was not too practical.

Another proposal heretofore considered was providing an elevator platform for vertically raising the aircraft to a desired height behind and between already parked aircraft and then moving the aircraft or the entire elevator structure forward by either towing the same or by providing a horizontally movable platform thereon so that the wings of the raised aircraft overlap adjacently parked aircraft at ground or apron level. The complexity of structure of such a system is cumbersome and costly to construct and operate.

A third system has been proposed and this system included mounting an aircraft supporting platform on a pair of pivot arms, the pivot arms being pivoted to the platform at space points longitudinally thereof and also pivoted to fixed structure therebeneath at space points thereon. This type of apparatus which operates on a parallelogram principle has disadvantages in that it places a tremendous load on the fixed pivots to the fixed structure and thus necessitates tremendous power to swing the pivot arms upwardly about fixed pivot axes. Another and far greater disadvantage of this system is that to provide sufficient horizontal movement of the platform so that the liftover of the aircraft can adequately clear already parked aircraft resulted in arms or links which were so long that they raised the platform to impractical height.

A primary object of the present invention is to provide a method and a system or apparatus which will increase the parking facilities of existing aircraft terminals as well as future aircraft terminals without requiring further additions of land, the system and method being simple and inexpensive to install compared to similar systems and also easier to operate.

Another object of the present invention is to provide a method and a system for parking aircraft in a raised position with the wings of the aircraft overlapping wings of adjacent aircraft, the method and system contemplating simultaneously moving the aircraft vertically and horizontally with the horizontal movement being greater than the vertical movement whereby the aircraft can be lifted over and clear of aircraft parked at ground level.

A further object of the present invention is to provide a method and a system for parking aircraft in a raised position, the method and system requiring a minimum of power to operate.

Ancillary to the preceding object it is a further object of the present invention to provide an apparatus for lifting an aircraft from ground level to a position where its wings overlap the wings of another aircraft, the apparatus being positive and safe in its operation.

These and other objects and advantages of the present invention will appear more fully in the following specification, claims and drawings in which:

FIGURE 1 is a schematic perspective view of an airport terminal area utilizing the system and method of operation of the present invention, the view illustrating one aircraft being raised upwardly and positioned over the wings of two adjacently parked aircraft so that its wings overlap thereby reducing the total area necessary to park three aircraft;

FIGURE 2 is a vertical section of the apparatus for raising the aircraft according to the present invention, the view illustrating the platform with an aircraft thereon in the lower or ground level position;

FIGURE 3 is a view similar to FIGURE 2 but illustrating the aircraft on the platform with the platform in the raised position;

FIGURE 5 is an end view of the rear truss structure taken substantially on the line 5—5 of FIGURE 4, and FIGURE 6 is a view similar to FIGURE 5 but illustrating the truss structure in a position with the platform elevated.

Figure 4:
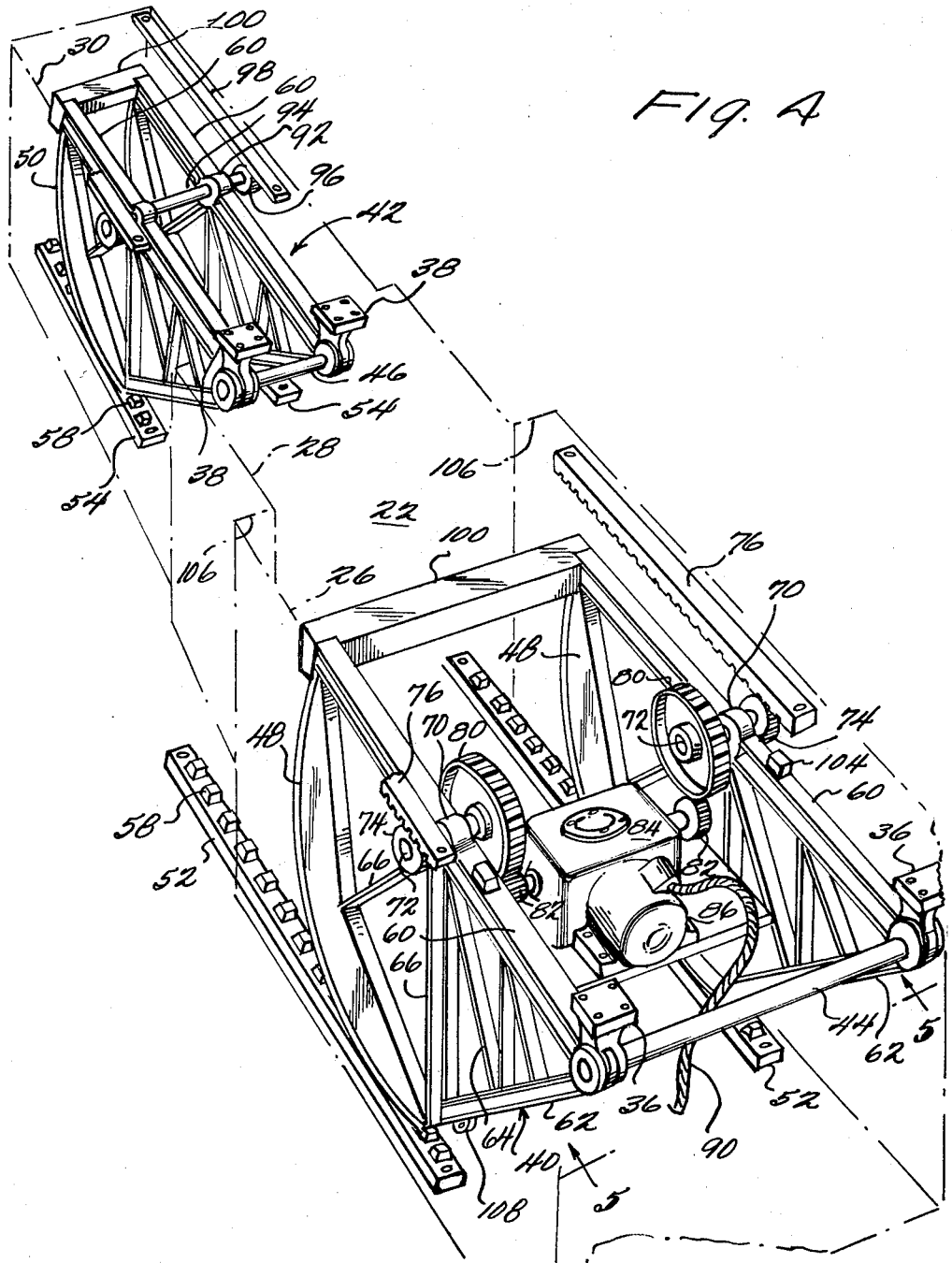
FIGURE 4 is a perspective view of the pit with the trusses and their segmental girders therein for elevating the platform, the platform being omitted from the view for the purpose of clarity.

Referring now to the drawings wherein like character or reference numerals represent like or similar parts and in particular to FIGURE 1 of the drawings, there is disclosed a typical parking area complex at an airport terminal, the view illustrating the parking of aircraft according to the present invention. While FIGURE 1 merely illustrates parking spaces for three aircraft, it will be understood that the arrangement shown is merely for description of the present invention, the arrangement being capable of use when any number of aircraft are parked nose in or nose out of the terminal at their individual loading zones.

As will be apparent from FIGURE 1, the arrangement illustrated therein enables the parking of aircraft in very close relationship to each other thereby using considerably less ground space than if the aircraft were parked wing tip to wing tip. Additionally, the arrangement shown provides for simpler handling of aircraft than if the aircraft were parked, for example, at an angle to the concourse in staggered relationship where it would be necessary to continually move adjacent aircraft around in order to bring aircraft in for loading and unloading the same. In the present system, any of the aircraft may be parked or may be removed from its parking area without interference to or movement of adjacently parked aircraft.

In more detail, the parking area complex, which is generally designated at 10, includes the usual concrete apron area 12 at ground level upon which a number of the aircraft A are parked in specific parking areas nose in to the terminal building (not shown) and the loading ramps diagrammatically represented by the broken lines 14. Of course, suitable ramps, elevators, stairways or telescoping loading platforms would be provided for access to the aircraft A.

According to the present invention the two aircraft A parked on the apron 12 at ground level would have their wing tips spaced just far enough apart to permit the fuselage and appurtenances such as the landing gear of of a third aircraft B to fit therebetween when the third aircraft B is parked in a raised position with its wing overlapping the wings of aircraft A on each side thereof. As shown in FIGURE 1, a second loading ramp 16 may be provided for aircraft B, this loading ramp being elevated above the ramp 14. By providing separate loading ramps 14 and 16 at different elevations, congestion of passengers within the terminal can be materially reduced as it would completely segregate the loading and unloading of the different aircraft. Although the drawings illustrate a second loading ramp 16 elevated above the first ramp 14, it will be understood that in some situations, it might be desirable to merely provide an elevator arrangement for access to aircraft B, the elevator being from the ground level.

Referring now to FIGURES 2 and 3 as well as the previously mentioned FIGURE 1, the method for raising the aircraft B to a position shown in FIGURES 1 and 3 without interference to previously parked aircraft A includes a movable platform 18 arranged to move from a position at ground or apron level rearwardly of and from between the two aircraft B to a raised position vertically above and horizontally forwardly thereof. When in the raised position, the aircraft B supported on the platform 18 has its wing positioned above and overlapping the wings of two adjacently parked aircraft. In order to obtain clearance of the wing tips of the aircraft A by the wings of the aircraft B, the platform 18 must be moved in a trochoidal path represented by the broken lines at 20 in FIGURE 3 so that the platform, which has simultaneous horizontal and vertical movement also has more horizontal movement for a desired vertical movement. In other words, the rate of horizontal movement is greater than the rate of vertical movement with the horizontal movement and vertical movement of the platform being simultaneous. To obtain the heretofore described movement of the platform, it is necessary for the platform 18 to be mounted for movement on a pivot axis which rolls or moves horizontally during movement of the platform. Of course, the platform must be maintained level or horizontal in all positions of its movement.

A novel apparatus for accomplishing the above method of movement for the the platform 18 will now be described in detail. An elongated pit 22 having reinforced side and end walls 24 is provided in the apron 12 at each point intermediate the parking spaces for two adjacent aircraft A. The pit 22, which must be deep enough for the mechanism to raise the platform 18, has its longitudinal axis parallel to the axes of the parking areas for ground level parked aircraft. The pit has a relatively wide rear portion 26 which is substantially of the same plan shape as the rear portion of the platform 18. The width of the platform 18 on its rear portion must be wide enough to receive the tread of the main landing gear of the aircraft B to be parked thereon whereas the front portion of the platform can be narrower as it receives only the nose gear. Consequently, the platform in plan is T-shaped and the pit 22 is provided with an intermediate portion 28 for receiving the forward portion of the platform 18 when the platform is in the lowered position of FIGURE 2 and is level or substantially level with the ground or apron 12. The forward portion 30 of the pit 22 can have a width even less than the intermediate portion 28 as it is not necessary for this portion of the pit to receive any part of the platform 18.

As shown in FIGURES 1, 2 and 3, the forward portion of the pit 30 is provided with folding doors 32 so that this portion of the pit is covered when the platform 18 is in the lower position and thus prevents personnel from inadvertently falling into the pit. When the platform 18 is in the raised position, the doors 32 swing up on both sides of the forward portion of the pit 30 and thus provide an effective barrier to prevent personnel inadvertently falling within the pit. A removable guard rail or fence 34 may be provided around the remaining portions of the pit 22 when the platform 18 is raised so that personnel are protected from this area.

The platform 18, which is preferably fabricated from steel, although it may be made from other metals or reinforced concrete or the like, is provided on its lower surface with a first pair of laterally spaced trunnions 36 adjacent its rear end. The trunnions 36 have a common axis transverse of the longitudinal axis of the platform 18. A second pair of laterally spaced trunnions 38 is provided on the platform's 18 forward end, the trunnion 38 having a common axis parallel to the axis of trunnions 36. The trunnions 36 and 38 respectively are pivotally connected to a pair of truss structures 40 and 42 by any suitable means, for example, the rods or axles 44 and 46 respectively (FIGURE 4).

Each of the truss structures 40 and 42 are provided with pairs of segmental girders or arches 48 and 50 respectively, the segmental girders 48 and 50 being arranged to cooperate with fixed horizontally extending tread plates 52 and 54 mounted on the bottom of the pit 22. The segmental girders 48 and 50 have equal radius of curvatures and each is provided with pockets 56 (FIGURE 6) along its peripheral surface for receiving upstanding lugs 58 on the tread plates 52. Since the segmental girders 48 and 50 must be of the same radius and since each must travel the same distance on its respective tread plate, the tread plates 52 and 54 have the same effective length of contact with their respective girders.

Referring now to FIGURES 4, 5 and 6, it will be noted that each of the truss structures 40 and 42 include a pair of beam members 60 on either side of the same. Since the truss structures 40 and 42 are substantially identical, the description of the truss structure 40 will suffice for both of the truss members. The beams 60 are connected at one end to the end of the respective segmental girders 48, the other end of each of the beams being connected to the ends of stiffening members 62. The stiffening members 62 are connected at their other ends to the opposite ends of the segmental girders 48 and lie substantially on a chord of an imaginary circle through the circumference of the segmental girders 48. Additional stiffening members 64 are provided between the beam members 60 and the stiffening members 62 whereas further stiffening members 66 lying on a radius of the girders 48 extend between the girders 48 and the respective members 60. As will be appreciated, the frames the truss structures made up by the stiffening members and the girders 48 on either side of the truss 40 may be provided with cross-bracing if necessary or if desired.

As shown in FIGURES 2 and 3, the segmental girders 48 and 50 are quadrants but they may be of slightly greater or slightly less circumferences if the roll for the trusses 40 and 42 is desired to be greater or less than 90°.

Additionally, it will be noted that the beam members 60 are substantially equal in length to the diameter of the circle defined by the curvature of the girders. As will be explained in more detail later in the specification, the length of the beam members may be varied to control the height to which the platform is raised. Also, the radius of the girders can be varied to control the height to which the platform 18 is raised.

Referring back to FIGURE 4, it will be noted that the truss structure 40 is provided with a bearing pillow box 70 on each of the beam members 60, the bearing pillow boxes 70 rotatably supporting shafts 72 on an axis common with the axis of the girders 38. The shafts 72 have pinions 74 mounted on their outer ends for cooperating with inverted horizontal racks 76 fixedly supported in cutouts 78 provided in and longitudinally along the side walls of the pit 22.

The opposite end of each of the shafts 72 is provided with a gear 80 which meshes with a drive pinion 82 mounted on a drive shaft of a speed reduction unit 84 for an electric brake and motor unit 86. The electric brake and motor unit 86 and speed reduction unit 84 are fixedly supported on a plate member 88 carried by and moved with the truss structure 40. Electric power is supplied to the electric brake and motor unit 86 by means of a flexible cable 90. The electric motor of the unit 86, which is reversible, drives the pinions 82 to turn the gears 80 and thus cause the pinions 74 to travel horizontally along the racks 76. Horizontal movement of the axis of roll of the truss 40 will cause the girders 48 to roll on the tread plates 32.

Referring to the front truss structure 42, which is substantially identical to the rear truss structure 42, it will be noted that it is not necessary to provide a motor on the same. Consequently, the front truss structure 42 is provided on its beam members 60 with bearing pillow boxes 92 which rotatably support a shaft 94 on the axis of roll of the truss structure. The outer ends of the shaft 94 are provided with guide rollers 96 bearing against downwardly facing horizontal bearing strips 98 suitably supported longitudinally along the side walls of the front portion 30 of pit 22.

In order to further reduce the power necessary to raise and lower the platform 18, the truss structures 40 and 42 may be provided with counterweights 100 secured to their respective girders, the counterweights 100 being sufficient to counteract at least a portion of the weight of the platform but preferably the entire weight of the platform. Of course, it is conceivable that the counterweights can be detachably secured to the truss structures 40 and 42 if it is desired to counteract a portion of the weight of the aircraft as well as the complete weight of the platform. As shown in FIGURES 2 and 3, the counterweight 100 on the front truss 42 is stored in a pocket 102 provided in the front end wall of the pit 22 when the platform 18 is raised.

The rear truss structure 40 is provided with bumpers 104 on its beam members 60, the bumpers being positioned so as to engage the jog in the side wall of pit 22 as indicated at 106 when the truss structures 40 and 42 are rolled to a position to elevate the platform 18. The bumpers 104 thus limit the upward movement of the platform 18. In order to insure that the platform is positively locked in the raised position, a locking member 108 is carried on the stiffening member 62. The locking member 108 includes a bar or latch 110 movable to engage a cutout 112 provided in the wall of pit 22. Any suitable means may be used to actuate the locking member.

The system of the present invention is operated in the following manner. With the platform 18 positioned at ground or apron level 12, the aircraft B is taxied or towed thereon. When the aircraft B has been positioned on the platform 18 at ground level, it will be between the two aircraft A but with its wings positioned near the empennage of the two aircraft A assuming the two aircraft A are in their parked position. The motor 86 is then energized to drive the pinions 74 horizontally forward along the racks 76. This will cause both truss structures 40 and 42, since they are both pivotally attached to the platform 18, to roll about their segmental girders 48 and 50 respectively. The electric motor 86 need only be in the order of 250 horsepower to lift in one minute an aircraft weighing in the order of 350,000 pounds as the mechanical advantage provided in their rolling type of truss structure materially reduces the power requirements. Additionally, the proper use of the counterweights also assists in reducing the power requirement.

Since the trusses 48 and 50 are rolling types of truss structures and thus roll about an axis which simultaneously moves horizontally during the roll, the path of the platform 18 is trochoidal. As mentioned earlier in the specification, the distance X between the pivot point of the truss structures 40 and 42 to the platform 18 and their respective roll axes determines the height to which the platform 18 is elevated. As shown in the drawings, the distance X is equal to the radius of the segmental girders. However, if the distance X is increased, both the horizontal movement and the vertical movement of the platform will be increased. The distance X determines the specific trochoidal path of the platform as it is in effect on the radius or an extension thereof of a circle which is rolling without slippage along a straight line and the trochoid is traced by a point on this radius or extension thereof, namely, the pivot point of the truss structures to the platform 18.

While a preferred form of means for driving the pinions 74 is disclosed as an electric motor 86, the means for rolling the truss structures about their segmental girders could be a hydraulic operation or a rope drive such as disclosed in our prior U.S. Patent No. 3,284,888 issued Nov. 15, 1966. Additionally, while the present specification discloses positively driving only the rear truss structure 40, it should also be understood that, if desired, both truss structures could be driven simultaneously or the motor could be utilized to drive only the front truss structure.

A machinery platform supporting multiple motor driven pinions could be suspended between the front and rear centers of roll at locations 74 and 96 to drive the truss structures.

While the objects and advantages of the method and/or system of the present invention have been fully and effectively accomplished by the disclosures in the specification and drawings, it will be understood that some changes and modifications can be made to the method and/or system without departing from the principles and scope of the invention involved.

What is claimed is:

1. A method of parking an aircraft in a raised position with its wings positioned above and overlapping the wings of an adjacently parked aircraft comprising the steps of: positioning the aircraft on a movable platform at ground level; raising the platform with the aircraft thereon simultaneously vertically and horizontally in a trochoidal path about a rolling pivot which is also simultaneously moving horizontally; maintaining the platform in the horizontal position at all times; and moving the platform horizontally for a greater distance than vertically.

2. A method as claimed in claim 1 in which moving of the platform horizontally is at rate of speed faster than the rate of speed of vertical movement.

3. A method as claimed in claim 1 in which maximum elevation to which the platform is raised is equal to the radius of a circle defining the trochoidal path.

4. A method as claimed in claim 1 including positively locking the platform in a raised position.

5. A method as claimed in claim 1 including counterweighting at least a portion of the weight of the platform during any position of its movement.

6. A method as claimed in claim 1 in which the moving of the rolling pivot is in the same horizontal direction as the moving of the platform.

7. In a system for parking an aircraft with its wings positioned above and overlapping wings of adjacently parked aircraft, an apparatus for raising and lowering the aircraft comprising: an elongated platform for supporting the aircraft; at least one segmental girder pivotally connected to said platform and a horizontally extending fixed tread plate upon which said segmental girder rolls to simultaneously move said platform horizontally and vertically in a trochoidal path while maintaining said platform horizontal; and including driving means to roll said segmental girder about an axis movable horizontally.

8. A system as claimed in claim 7 including means to positively lock said girder against movement when said platform is in a raised position.

9. A system as claimed in claim 7 including means carried by said segmental girder on a radius of the same to counterbalance at least a portion of the weight of said platform.

10. In a system for raising an aircraft from ground level to a parked position with its wings overlapping the wings of adjacently parked aircraft comprising: an elongated pit; a first truss structure positioned in said pit and having segmental girder means thereon whereby the first truss structure may be rolled about a horizontally movable horizontal axis of roll; a second truss structure positioned in said pit and spaced longitudinally from said first truss structure, said second truss structure having segmental girder means thereon whereby said second truss structure may be rolled about a horizontally movable horizontal axis of roll parallel to and spaced longitudinally from the horizontal axis of roll of said first truss structure; an elongated platform pivotally connected respectively to said first truss structure and to said second truss structure on horizontal axes spaced longitudinally of the platform; driving means to roll said first and second truss structures upwardly and downwardly on their respective segmental girders about their respective axes of roll to cause said platform to move vertically and horizontally in a trochoidal path.

11. A system as claimed in claim 10 including tread plate means positioned in the bottom of said pit and extending horizontally and longitudinally thereof, said tread plate means having longitudinally spaced lugs thereon, said respective segmental girder means of said first and second truss structures having pockets for receiving the lugs as said first and second truss structures are rolled.

12. A system as claimed in claim 10 in which said means to roll said first and second truss structures includes rotatable pinion means carried by one of said first and second truss structure on its axis of roll, a horizontal fixed rack extending longitudinally of said pit, and cooperating with said pinion means, and power means for rotating said pinion means.

13. A system as claimed in claim 10 including counterweights carried by said first and second segmental girders for counterweighting the weight of said platform.

14. A system as claimed in claim 13 in which said counterweights are detachable.

15. A system as claimed in claim 10 including means to positively lock at least one of said first and second trusses when said platform is raised.

References Cited

UNITED STATES PATENTS

| | | |
|---|---|---|
| 1,751,721 | 3/1930 | Bellmann. |
| 2,181,881 | 12/1939 | Ferris _____ 114—43.5 XR |
| 3,284,888 | 11/1966 | McClain et al. _____ 29—407 |
| 1,035,826 | 8/1912 | Baltzer. |
| 1,139,243 | 5/1915 | Warner _____ 187—8.49 |
| 2,660,320 | 11/1953 | Wullschleger. |
| 2,614,710 | 10/1952 | Gregory. |

FOREIGN PATENTS

| | | |
|---|---|---|
| 606,790 | 11/1934 | Germany. |

GERALD M. FORLENZA, Primary Examiner

F. E. WERNER, Assistant Examiner

U.S. Cl. X.R.

187—8.72, 19; 214—152; 254—94, 97